Patented Dec. 28, 1937

2,103,830

UNITED STATES PATENT OFFICE 2,103,830

METHOD FOR MASKING THE ODOR OF DRYING PAINTS, VARNISHES, AND THE LIKE AND FRAGRANT ODOR-MASKED PAINT

Leroy W. Shuger, Baltimore, Md., assignor to Baltimore Paint and Color Works, Inc., Baltimore, Md., a corporation of Maryland No Drawing. Application May 20, 1936, Serial No. 80,920

4 Claims. (Cl. 134—39)

This invention relates to a composition of matter for masking the odor of paints, varnishes, enamels, varnish stains, stains, emulsion paints, and protective coating compositions in general, during the period when drying, that is, after fresh application thereof to a surface.

A careful survey has shown that a majority of people object to the odor of drying paint. This dislike often is so strong that other types of decoration are substituted for painting or varnishing. It is, therefore, an object of this invention, to provide an odor-masked paint, that will overcome this tendency for substitution, and enable painting to be done without objection when the painting or varnishing of a surface becomes desirable.

It is still a further aim to provide a composition of matter whereby the various odors emitted by a paint during and subsequent to its application, are completely and properly masked in such a fashion as not to produce objectionable results.

Heretofore, attempts to overcome the odors emitted by paint during its application and subsequent drying have not been attended by much success. These failures have been due to one or a combination of the following causes:

(1) The fragrant odor of the masking agent employed was so intense that it was, if anything, more objectionable than the original paint odor.

(2) The fragrant odor produced by the masking agent persisted in the paint film after the paint itself had finished emitting its odors.

(3) The nature of the masking agent and the quantities in which it was added affected the working quality of the paint.

These objections have arisen primarily because a proper understanding of the problem appeared to be lacking. A consideration of what takes place when a paint is applied and subsequently dried is essential to an adequate solution of the matter. During application, and immediately thereafter, the odor that prevails is due to the evaporation of the solvent present in the paint. The following are examples of solvents which may be and are used in paint compositions: Mineral spirits, turpentine, kerosene, light petroleum distillates, and coal tar derivatives. The odors characteristic of these solvents will predominate during the entire period of evaporation thereof. These odors are more intense during application of the paint and subsequently decrease until they entirely disappear. The time for complete evaporation is dependent upon the amount of solvent used and its evaporation rate. This total time of evaporation can be determined theoretically from the two factors mentioned, and can also be actually measured by the use of an evaporation balance.

As soon as the solvent evaporates, the drying oil which is present, for example, linseed or Chinawood oil, will begin to oxidize. The odor arising from the oxidation is especially pungent at the beginning and the intensity thereof decreases as time goes on until it has totally disappeared. The time required for the complete disappearance of this odor is dependent upon the drying oil used and the amount thereof. The duration period is approximately from twenty to forty-eight hours. Thus, it will be seen that the so-called "drying" of a paint is essentially characterized by (1) evaporation of the solvent and (2) subsequent oxidation of the drying oil present.

It is a further aim of this invention to utilize an odor-masking agent which is composed of a number of individual odor-masking substances, such substances being of progressive volatility and used in such quantities as to correspond to the various odor-emitting phases of the paint itself. Thus, the agent should be compounded of ingredients which volatilize simultaneously with the solvent of the paint to thereby overcome the odor of the latter. These ingredients are used in such quantities, that they will perform their task and will then disappear with the solvent.

The odor-masking agent should also include ingredients whose purpose it is to mask the oxidation odor of the drying paint. This odor is especially pungent at the beginning of the drying and the odor-masking agent must include ingredients which are most volatile during the early part of the oxidation, and which will decrease in volatility to the same extent as the decreasing intensity of the "oxidation" odor. The quantities of these ingredients must be such that when the paint has completed its emission of any odors, the ingredients will have been depleted with the result that they leave no residual odor. With the above as a working basis, aided by knowledge of the formula of the paint to be treated and the volatility of those fragrant materials which permit their use in paint, one is able to provide an agent which can successfully mask the drying odors characteristic of the paint.

The ingredients which go to make up the masking agent must be carefully selected, as many fragrant compounds commonly employed in perfumes cannot be utilized. Any constituent so employed must possess the characteristic of not affecting the working qualities of the paint itself when used in the proportions hereinafter specified. The working characteristics which are most important and which must not be adversely affected are (1) proper drying, (2) brushing properties, (3) gloss, (4) flexibility of film, (5) adhesion of film, (6) durability, (7) leveling and (8) permanency of color. For example, the use of vanillin is undesirable as it has the tendency to change the color of a film of white paint into brown.

I have found that the following fragrant compounds can be used effectively if limited to proper proportions. They are arranged to fall within one of the four following groups classified according to volatility. These four groups are designated as (1) very volatile, (2) volatile, (3) semi-volatile, and (4) fixatives.

*Very volatile group*

| Name | Boiling point | Melting point |
|---|---|---|
| | °C. | |
| Amyl butyrate | 174 | |
| Ethyl acetate | 76 | |

*Volatile group*

| | Boiling point | Melting point |
|---|---|---|
| | °C. | |
| Benzyl Acetate | 216 | |
| Phenyl ethyl alcohol | 220 | |
| Citral | 228 | |
| Citronellol | 224 | |

*Semi-volatile group*

| | Boiling point | Melting point |
|---|---|---|
| | °C. | |
| Amyl salicylate | 279 | |
| Amyl cinnamic aldehyde | | |
| Geraniol | 230 | |
| Ionone | | |

*Fixatives*

| | Boiling point | Melting point |
|---|---|---|
| | °C. | °C. |
| Coumarin crystals | 291 | 69 |
| Musk ketone | | 135 |
| Musk xylene 100% | | 112–113 |
| Musk ambrette | | 85 |
| Heliotropine | | 54 |
| Phenyl acetic acid | | 76 |

While I have found the above listed substances to be useful, I do not wish to be limited only thereto, since substantially equivalent materials may be substituted and still not depart from the spirit of the invention.

The boiling point may serve as an indication of the volatility—thus members of (1) very volatile group would include those substances which have a boiling point below 216° C., members of (2) the volatile group would have a boiling point range from 216–225° C., members of (3) the semi-volatile group, a range of 225° C.–279° C., and members of (4) the fixatives would comprise liquids having boiling points above 279° C. and solids at room temperatures.

As will be understood, other fragrant substances may be substituted for those listed in the various groups, provided their use does not interfere with the working qualities of the paint and does not defeat the basic idea of odor-masking based upon the progressive volatility of the composition.

The following will serve as an example of how a paint may be effectively odor-masked. As illustrative, there is set out below the formula of an inside flat wall paint.

| | Pounds |
|---|---|
| Titanium pigment | 1000 |

| | Gallons |
|---|---|
| Spar varnish | 49½ |
| Heat bodied linseed oil | 8¼ |
| Mineral spirits | 33 |
| Cobalt dryers | 1½ |

The spar varnish formula is composed of the following:

| | Pounds |
|---|---|
| Ester gum | 100 |

| | Gallons |
|---|---|
| China-wood oil | 24 |
| Heat bodied linseed oil | 6 |
| Mineral spirits | 45 |

Let it be assumed that the mineral spirits present will take approximately two hours to leave the film under ordinary conditions after it is applied.

At the end of this time, the drying oil (linseed and China-wood oils) will begin to oxidize and the odor emitted will be due to this reaction. The intensity of these odors is especially pungent during the first three hours of the oxidation period and will gradually decrease until forty-eight hours after the initial brushing all paint odors will have completely disappeared.

To properly mask the odor of the paint, whose formula is set out above, the fragrant composition set out below is employed and is used in the proportion of one part by weight of the composition to 1300 parts by weight of the paint.

| | Parts by weight |
|---|---|
| (1) Amyl butyrate | 6.0 |
| (2) Benzyl acetate | 21.6 |
| (3) Phenyl ethyl alcohol | 31.2 |
| (4) Citral | 5.6 |
| (5) Geraniol | 20.0 |
| (6) Phenyl acetic acid | 7.8 |
| (7) Coumarin crystals | 7.8 |

Ingredients (1), (2), (3), and (4) will volatilize during the two hours it takes for the mineral spirits to evaporate. During this time, these ingredients will mask the odor of the mineral spirits and then disappear.

When the oxidation odor is emitted, it will be masked by ingredients (5), (6) and (7). The geraniol is effective during the early hours of oxidation when the odors are most pungent. The fixatives have a faint sweet smell which will overcome the decreasing odors of the paint until forty-eight hours after initial brushing, all odors will have completely disappeared. The odors of ingredients (5), (6) and (7) decrease in intensity at the same rate as the oxidation odor with the result that at the end of the forty-eight hour period, there will not be present any odor due either to the paint or the masking agent.

By following the principles set out above, namely the addition to a paint of an odor-masking composition made up of a number of odor-masking substances which are of progressive volatility and which volatilize at the same rate as the various odor-emitting phases of the paint, the paint odors are effectively masked.

The ingredients specified, if used as set out above, will not produce any effect on the working qualities of the paint. The invention contemplates there should not be an excess of odor-masking substances present in the paint at any one time so as to produce an aroma even more objectionable than the paint itself. Also it is contemplated that the odors produced by the paint during the entire drying period should be overcome without giving rise to any residual odor, after the paint itself no longer emits any odors. Let it be assumed that it is attempted to mask the paint odor of the paint whose formula is set out above by the use of benzyl acetate alone. To mask the odor of the paint during the entire forty-eight hour period would require such a quantity of benzyl acetate as would materially affect the working qualities of the paint. Furthermore, there would be an excess of this ingredient present during the early part of the drying period with the result that the fragrant odor would be so prominent as to be sickening. If, on the other hand, it were attempted to use amyl salicylate alone and make it intense enough even to slightly overcome the solvent odor, such quantities would have to be used as would be objectionable during the last twenty-four hours of the drying period, and in addition, the fragrant odor would be so lasting that a residual fragrant odor would remain behind and would prevail many days after the paint had finished emitting drying odors.

While the invention has been set up in great detail and the method of using same, it will be obvious that various changes and modifications thereof may be made and it is desired to cover all such and to be limited in this respect only as may be necessary by the scope of the claims hereto appended.

Having thus described the invention, what I claim is:

1. An inside flat wall paint containing mineral spirits and drying oils incorporated with a fragrant odor-masking composition having the substances listed in the following proportions by weight; one part by weight of the said composition being used to approximately 1300 parts of said paint by weight:

| | |
|---|---|
| Amyl butyrate | 6.0 |
| Benzyl acetate | 21.6 |
| Phenyl ethyl alcohol | 31.2 |
| Citral | 5.6 |
| Geraniol | 20.0 |
| Phenyl acetic acid | 7.8 |
| Coumarin crystals | 7.8 |

2. The method of masking the odor of drying paints, varnishes and the like containing volatile solvents having pungent odors and drying oils which comprises adding thereto a fragrant odor-masking composition composed of a plurality of individual fragrant odor-masking ingredients of progressive volatility, some of said fragrant odor-masking ingredients serving to mask the odor of the evaporating volatile solvents in the paint or varnish as it dries, the quantity of said fragrant ingredients masking the odor of the evaporating volatile solvents being sufficient to complete the masking of the odor of the evaporating volatile solvents and to disappear with said evaporating solvents, other of said individual fragrant odor-masking ingredients serving to mask the odor of oxidation of said drying oils after the evaporation of said solvents as the paint or varnish dries, the quantity of said fragrant ingredients masking the odor of the oxidizing drying oils being sufficient to complete the masking of the odor of the oxidizing drying oils and to disappear with the completion of the oxidation of said drying oils.

3. The method of masking the odor of drying paints, varnishes and the like containing volatile solvents having pungent odors and drying oils which comprises adding thereto a fragrant odor-masking composition composed of a plurality of individual fragrant odor-masking ingredients of progressive volatility, some of said fragrant odor-masking ingredients serving to mask the odor of the evaporating volatile solvents in the paint or varnish as it dries, the quantity of said fragrant ingredients masking the odor of the evaporating volatile solvents being sufficient to complete the masking of the odor of the evaporating volatile solvents and to disappear with said evaporating solvents, other of said individual fragrant odor-masking ingredients serving to mask the odor of oxidation of said drying oils after the evaporation of said solvents as the paint or varnish dries, the quantity of said fragrant ingredients masking the odor of the oxidizing drying oils being sufficient to complete the masking of the odor of the oxidizing drying oils and to disappear with the completion of the oxidation of said drying oils, the ingredients serving to mask the odor of said evaporating solvents being of greater volatility than the ingredients serving to mask the odor of the oxidizing drying oils.

4. The method of masking the odor of drying paints, varnishes and the like containing volatile solvents having pungent odors and drying oils which comprises adding thereto a fragrant odor-masking composition composed of a plurality of individual fragrant odor-masking ingredients of progressive volatility, some of said fragrant odor-masking ingredients serving to mask the odor of the evaporating volatile solvents in the paint or varnish as it dries, the quantity of said fragrant ingredients masking the odor of the evaporating volatile solvents being sufficient to complete the masking of the odor of the evaporating volatile solvents and to disappear with said evaporating solvents, other of said individual fragrant odor-masking ingredients serving to mask the odor of oxidation of said drying oils after the evaporation of said solvents as the paint or varnish dries, the quantity of said fragrant ingredients masking the odor of the oxidizing drying oils being sufficient to complete the masking of the odor of the oxidizing drying oils and to disappear with the completion of the oxidation of said drying oils, the ingredients serving to mask the odor of the oxidizing drying oils being composed of a plurality of substances of progressive volatility.

LEROY W. SHUGER.